United States Patent Office 2,755,427
Patented July 17, 1956

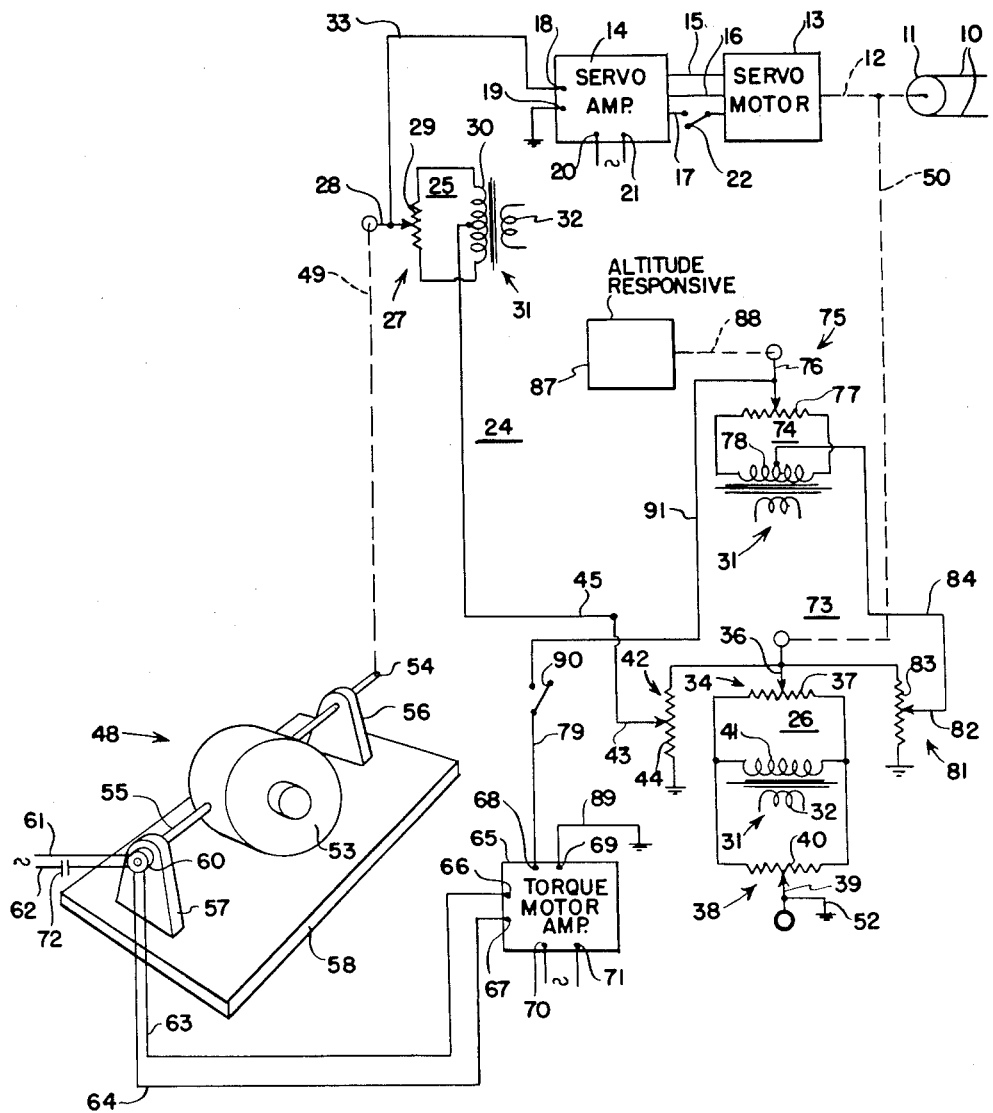

2,755,427

AUTOMATIC PILOTS

Benjamin H. Ciscel, Minnetonka Mills, Minn., assignor to Minneapolis-Honeywell Regulator Company, Minneapolis, Minn., a corporation of Delaware Application December 28, 1951, Serial No. 263,882

14 Claims. (Cl. 318—489)

This invention pertains to flight control apparatus for an aircraft, and more particularly to gyroscope controlled apparatus adapted to be mounted on an aircraft, said apparatus embodying mechanism for operating a control surface of said aircraft.

Arrangements of the above character have been heretofore proposed which embody a first gyroscope operable in proportion to any angular displacement in the position of an aircraft and a second gyroscope operable in proportion to the rate of angular displacement of the craft. Other arrangements have utilized electrical networks to derive rate from displacement signals.

It is an object of this invention to provide an improved flight control apparatus wherein a single gyroscope has an operation that is a combination of the angular displacement of said craft and the rate of angular displacement.

It is a further object of this invention to provide an improved flight control apparatus with a gyroscope having angular freedom about two axes and which gyroscope is provided with restraining means opposing its rotation about one axis due to rotation of the aircraft about an axis wherein the restraining means is energized in relation to angular movement of the gyroscope about its axis.

It is a further object of this invention to provide, in the above flight control apparatus, means to operate a servomotor from the rotation of said gyroscope about its one axis and to control said restraining means in accordance with the extent of servomotor movement.

Additionally, a further object of this invention is to include in said flight control apparatus means to control the operation of the servomotor from the extent of movements of the gyroscope about its axis and the extent of operation of the servomotor.

It is a further object of this invention to provide a flight control apparatus with a single gyroscope having but two axes of freedom which is precessed about one of its axes in response to the rotation of the craft about one of its axes and to the extent of operation of a motor that positions an aircraft control surface, and wherein said motor is operated an extent in proportion to the precession response of said gyroscope, with further provisions to modify the effect of any said motor operation on the precession of the gyroscope.

The above and further objects of the invention will hereinafter appear. For a better understanding of this invention reference is made to the following description of the accompanying drawing in which the sole figure represents the general arrangement of the apparatus.

Referring to the drawing, the invention is incorporated in the elevator channel of an automatic pilot for operating the elevator of an aircraft. It is to be understood that with slight modifications in the arrangement, the apparatus may also be used to control the aileron channel or the rudder channel of an automatic pilot. Reverting to the drawing, the elevator (not shown) is operated by cables 10 extending from a cable drum 11 carried on an output shaft 12 of a servomotor 13. The servomotor 13 is connected to an amplifier 14 by electrical connections 15, 16, and 17. The amplifier 14 is of the A. C. discriminator type and includes signal input terminals 18, 19, and power input terminals 20, 21. The amplifier-motor combination may be such as that disclosed in the patent to Hamby 2,466,702. Thus in the amplifier-servo combination, electrical connection 17 serves to transmit direct current to brake windings of the servomotor whereby the servomotor becomes operatively engaged with the control surface to hold the same in locked position during periods when the servomotor 13 is not operated by the amplifier. A single pole single throw switch 22 is included in the electrical connection 17. Electrical connections 15 or 16 are alternatively energized depending upon the phase relationship of a signal voltage across terminals 18, 19 with respect to the voltage across power terminals 20, 21. Electrical connections 15 and 16 serve to transmit energization to their respective clutch windings in servomotor 13.

Connected to signal input terminals 18 and 19 of the servo amplifier 14 is a voltage balanceable control network 24 which on unbalance causes the amplifier to operate. Network 24 comprises a gyroscope voltage signal generator 25 and a synchronizer-servomotor follow-up signal generator 26. Signal generator 25 consists of potentiometer 27 having a slider 28 and a resistor 29 which is connected across a secondary winding 30 of a transformer 31 having a primary winding 32. A conductor 33 extends from amplifier terminal 18 to slider 28. Signal generator 26 comprises a follow-up potentiometer 34, a synchronizing or centering potentiometer 38, a voltage dividing potentiometer 42 for controlling the displacement effect in the automatic pilot, and a secondary winding 41 of transformer 31. The secondary 41 of signal generator 26 is one of a plurality of secondary windings of transformer 31 having a common primary 32. Follow-up potentiometer 34 comprises a slider 36 and a resistor 37 which is connected across secondary winding 41. Potentiometer 38 comprises a slider 39 and a resistor 40 which is connected across secondary winding 41 in parallel with resistor 37. Potentiometer 42 comprises a slider 43 and a resistor 44. One end of resistor 44 is connected to slider 36 and the opposite end thereof is connected to ground. A conductor 45 extends from a center tap of secondary winding 30 of generator 25 to adjustable slider 43 of voltage divider 42. The circuit is completed from the ground end of resistor 44 to ground conductor 46 extending from terminal 19 of amplifier 14. Slider 28 is positioned along resistor 29 through a suitable operating connection 49 extending from a gyroscope 48. Slider 36 is positioned along resistor 37 in generator 26 in accordance with the extent of movement of servomotor shaft 12 by a suitable follow-up connection 50 driven by shaft 12. Slider 39 is manually adjusted along resistor 40 to shift the control point of the system and slider 43 is adjusted along resistor 44 to select any desired proportion of the voltage geenrated by the relative adjustment of sliders 36 and 39. A conductor 52 extends from slider 39 to ground.

Gyroscope 48 comprises a casing 53 which rotatably supports a rotor not shown. At right angles to the spin axis of the rotor, the casing is supported by trunnions 54, 55 in pedestal bearings 56, 57. The pedestal bearings are mounted on a supporting plate 58. It is evident that the gyroscope rotor has angular freedom about its spin axis and also about the axis of trunnions 54, 55. In its present application, the platform is arranged in the aircraft so that the axis of trunnions 54, 55 is in the direction of the longitudinal axis of the craft and the spin axis of the rotor is parallel to the vertical axis of the craft so that upon movement of the craft about its pitch axis, the gyroscope will precess about the axis of trunnions 54, 55. The precession of the gyroscope is restrained by a torque motor 60 arranged between trunnion 55 and pedestal bearing 57. The restraining motor 60 may comprise a two phase induction motor for applying torque between the pedestal bearing 57 and trunnion 55. The motor 60 may thus include a line winding which is constantly energized by electrical connection 61, 62 connected to a source of alternating voltage through a phase shifting condenser 72. The motor also includes an amplifier winding which is energized by electrical conductors 63, 64 extending from a torque motor amplifier 65.

The torque motor amplifier 65 is of the A. C. discriminator type comprising output terminals 66, 67; signal input terminals 68, 69; and power input terminals 70, 71. Conductors 63, 64 extend from the torque motor 60 to the amplifier output terminal 66, 67. The conductors 63, 64 serve to energize the amplifier winding of motor 60 in quadrature relation with respect to the energization of its line winding. This energization may lead or lag the energization of the line winding depending upon the phase relationship of the voltage across amplifier signal input terminals 68, 69 with respect to the voltage across power input terminals 70, 71.

Connected across the amplifier signal input terminals 68, 69 is a balanceable network 73. Network 73 comprises a signal generator 74, which in the present application of the invention serves as a standard or memory for the aircraft, and a potentiometer 81 for controlling the rate effect in the automatic pilot. Generator 74 comprises in the present instance, an altitude potentiometer 75 having a slider 76 and a resistor 77 with the resistor 77 connected across a secondary winding 78 of transformer 31. A conductor 79, a single throw switch 90, and a conductor 91 connect slider 76 to amplifier terminal 68. Slider 76 is positioned along resistor 77 by an altitude responsive device 87 through a suitable operating means 88. The details of the altitude responsive device 87 are unnecessary to an understanding of the present invention and any altitude responsive device which is inoperative until at a desired altitude or which includes a disengageable drive engageable at the selected altitude for moving slider 76 with respect to resistor 77 upon changes in altitude of the craft from the selected altitude will be found suitable.

Passing to the remainder of network 73, rate control potentiometer 81 comprises a slider 82 and a resistor 83. One end of resistor 83 is connected to slider 36 of potentiometer 34 and the opposing end of resistor 83 is connected to ground which is common to the ground of conductor 52. The control circuit is completed by amplifier ground conductor 89 connected to terminal 69. Slider 82 may be manually adjusted along resistor 83 to select any desired portion of the voltages obtained by relative movements of sliders 36 and 39. A conductor 84 connects slider 82 with a center tap of secondary winding 78.

In its operation, the aircraft control surfaces may be manually operated by the conventional control column and rudder pedals until the aircraft has obtained a desired altitude and attitude about its pitch axis. During such manual operation of the control surfaces, the slider 76 will be maintained centered with respect to its resistor 77 by a suitable means until the desired altitude has been attained at which time the centering means may be disassociated from slider 76 and altitude control of slider 76 provided. The sliders 39 and 36 in generator 26 are also relatively positioned along their respective resistors so that the input circuit 73 to torque motor amplifier 65 is in a balanced condition. The slider 28 is centered with respect to its resistor 29. The single pole switch 22 may now be closed whereupon the brake windings of the servomotor 13 are energized to couple the elevator operatively with the servomotor. The single pole switch 90 may also be closed to complete the input circuit of amplifier 65. The slider 43 of the displacement ratio potentiometer 42 and the slider 82 of the rate control potentiometer 81 may in general be adjusted so that the gyroscope 48 controls the elevator surface in accordance both with a proportion of the amount of change in attitude of the craft about the pitch axis and also in accordance with a proportion of the rate of change in said attitude of the craft about the pitch axis. For ease of understanding how the two proportions or functions of attitude change and rate of attitude change are obtained, the arrangement will be considered when it may function as a displacement automatic pilot and secondly when it may function as a rate automatic pilot.

When used as a displacement automatic pilot, slider 82 of potentiometer 81 is moved to the ground end of resistor 83; slider 43 is moved toward the upper end (shown) of resistor 44. With the control apparatus now engaged with the elevator, if the aircraft tilts about the pitch axis, the casing 53 of gyroscope 48 will be rotated about the axis of trunnions 54, 55 due to the precessing action of the gyroscope rotor. The output axis motion around 54, 55 is controlled by frictional clamping means (not shown). This rotation is communicated to slider 28 to displace the same along resistor 29 to derive a voltage between slider 28 and the center tap of secondary winding 30. The network 24 therefore is unbalanced, and this unbalance voltage is applied to terminals 18 and 19 of servomotor amplifier 14. Amplifier 14 operates one or the other of its relays to energize conductor 15 or conductor 16 causing rotation of the servomotor 13. The servomotor 13 rotates the cable drum 11 to position the elevator and simultaneously through the follow-up connection 50 displaces slider 36 along resistor 37. Amplifier 14 will be continued in operation until the input network 24 is balanced, therefore, slider 36 is moved along resistor 37 to develop an increasing voltage between slider 36 and slider 39. The slider 43 of voltage divider 42, being at the upper end of resistor 44, transmits this derived voltage, and when this follow-up voltage is equal to and opposite to the voltage from generator 25 the network 24 is again in balanced condition.

The aircraft now rotates about its axis in response to the turning moment applied by the displaced elevator, and the gyro rotor now precesses in the opposite direction due to this reverse angular movement of the aircraft. As the gyro 48 precesses it moves slider 28 toward the electrical center on resistor 27. Since slider 36 was previously displaced, the return of slider 28 in network 24 toward center unbalances network 24 in an opposite direction from that initially provided by movement of slider 28. The amplifier 14 causes reverse movement of servomotor 13 which also moves the elevator control surface toward normal position. The servomotor 13 also moves its follow-up slider 36 toward normal position. The gyroscope 48 at this time functions as a true displacement device and precesses in one direction an extent dependent upon the magnitude of angular movement of the craft about its axis due to a transient disturbance. Since slider 82 is at the lower end of resistor 83, none of the voltage across network 26 is applied to the torque-motor amplifier 65. As the aircraft under the applied elevator moves back to its original position, the gyroscope 48 continues to precess in the opposite direction so that when the craft has regained its original attitude about the pitch axis, the gyroscope 48 is in unprecessed position.

The arrangement may now be considered when it functions as a rate automatic pilot. During this operation, slider 82 is moved to its uppermost position, slider 43 to its lowermost position, and switch 90 must be closed. Should the aircraft tilt about its pitch axis, from level flight position, gyroscope 48 will again precess about the axis of the trunnions 54, 55. Slider 28 again is moved relative to resistor 29 to generate a voltage between slider 28 and the center tap of secondary winding 30. Amplifier control network 24 is therefore unbalanced which results in operation of servo amplifier 14. Amplifier 14 operates servomotor 13 to position the elevator and through the follow-up connection 50 moves the slider 36 relative to resistor 37. Since slider 43 is at the lower end of resistor 44, none of the output of the follow-up generator 26 will be applied to servo amplifier 14. Hence the servo motor will continue to operate the elevator as long as slider 28 is displaced from its center position.

Since slider 82 is at the upper end of resistor 83, the output of network 26 now affects the torque motor amplifier. Thus the input circuit 73 of amplifier 65 is unbalanced. Motor 60 is energized and exerts a torque about trunnion 55 opposite to the torque due to the rate of pitch change of the craft. The torque about trunnion 55 keeps increasing as the servomotor 13 is operated. Omitting for the time being the operation of the standard 87 which as stated may be a constant altitude device, the displaced elevator, if we assume the craft initially has tilted downwardly about the pitch axis, causes a decrease in the rate of pitch of the aircraft. With the rate of pitch decreasing, the torque on the gyroscope 48 due to the motion of the aircraft becomes less than the torque applied thereto by motor 60 which is a function of the displacement of the elevator control surface. The excessive torque applied by motor 60 over that provided by the rotation of the craft moves slider 28 back and to the opposite side of the center of resistor 29. The amplifier 14 now effects rotation of servomotor 13 in the opposite direction tending to move slider 36 of the follow-up potentiometer 34 toward its center position.

However the displaced elevator continues to check still further the angular rate of movement of the aircraft about the pitch axis so that the torque from motor 60 on gyroscope 48 continues to exceed the torque due to rotation of the craft about the pitch axis. Consequently the slider 28 is maintained on the opposite side of the center of resistor 29 so that the amplifier 14 causes servomotor 13 to move slider 36 still further toward the center of resistor 37.

When the craft's angular rotation is stopped, there will be no torque applied to gyroscope 48 by rotation of the aircraft and under general conditions, the servomotor 13 will have moved slider 36 to the center of resistor 34 so that torque motor 60 no longer applies any precessing effect to gyroscope 48. Therefore the slider 28 is centered on resistor 29.

It is evident that if the elevator were displaced upwardly when the downward angular rotation of the aircraft were reduced to zero that slider 36 would also be displaced so that gyro 48 would be precessed by torque motor 60 to move slider 28 along resistor 29 in such a direction as to effect rotation of servomotor 13 to move slider 36 to the center of resistor 37. While the downward tilting of the craft has been stopped, there is no signal causing the craft to reverse its angular movement so as to return to its original level.

It is now apparent that with the rate gyroscope 48 stabilizing the aircraft about the pitch axis, the aircraft does not regain its original altitude. For this purpose, the altimeter 87 is provided which through its potentiometer 75 effects precession of the gyroscope 48 by torque motor 60 so that the original altitude of the craft, which was lost due to a transient disturbance, is regained.

Whether the gyroscope 48 operates purely as a rate gyroscope or a displacement gyroscope depends upon the relative position of slider 43 along resistor 44 of voltage divider 42 and the relative position of slider 82 of potentiometer 81 along resistor 83. If the sliders 43 and 82 assume generally the mid positions along their resistors, then it is evident that with torque now being applied to the gyroscope 48 by the torque motor 60 from voltage divider 81, due to an angular motion of the craft about the pitch axis, such torque applied by motor 60 prevents the gyroscope 48 operating as a pure displacement gyroscope. Therefore in order to return the aircraft to its original condition, the standard 87 is provided to exert an over-all control of the arrangement to insure that original conditions are restored. A compass signal could be used in the yaw axis. Alternatively, a manually operated signal generator could be used for manuevering the craft. Each would assume a position in the apparatus corresponding to that of altitude standard 87. The gyroscope 48 meanwhile stabilizes the attitude of the craft about the pitch axis tending to correct immediately for changes in attitude due to transient disturbances that might if uncorrected result subsequently in changes of altitude.

It will now be evident that there has been provided a novel apparatus for controlling the flight of an aircraft in which a single gyroscope with two axes of freedom has its movement about one axis controlled so that it effects on the apparatus an operation which is a composite result of craft angular displacement and rate of angular displacement and in which the relative effects of displacement and rate of displacement in said composite result may be varied.

Alternatively to the apparatus effecting control of the elevators, the apparatus may control the rudder or ailerons in a similar manner within which a directional stabilizing device may be substituted as a standard in place of an altimeter. Since many changes could be made in the above arrangement and other different embodiments of this invention could be made without departing from the principle thereof, it is intended that the above description of the accompanying drawing shall be considered as illustrative and not a limitation of the invention.

I claim as my invention:

1. Apparatus for controlling the flight of an aircraft having a control surface displaceable from a normal position, said apparatus comprising: motor means for positioning said surface; control means for effecting operation of said motor means; a balanceable system for operating said control means on unbalance thereof; a gyroscope responsive to movement of said craft about an axis related to said control surface; means operated by said gyroscope proportional to its extent of operation for unbalancing said system; means driven by said motor means in proportion to the displacement thereof from a normal position for rebalancing said system; torque applying means for said gyroscope; and means for energizing said torque applying means and also controlled by said motor driven means in said system.

2. The apparatus of claim 1, with means responsive to change in altitude of said craft for additionally energizing said torque applying means.

3. Apparatus for controlling the flight of an aircraft having a control surface, said apparatus comprising: actuating means for said control surface; control means for effecting reversible operation of said actuating means; a gyroscope movable about one axis relative to the craft responsive to movement of said craft about an axis controlled by said surface; a signal generator operated by said gyroscope and deriving a signal proportional to its operation and connected to said control means for initiating operation of said control means; a rebalancing signal generator operated by said actuating means and deriving a signal proportional to its operation from a normal position and connected to said control means for terminating operation of said control means; torque means for precessing said gyroscope about said one axis thereof perpendicular to said craft axis, and means connected to said rebalancing signal generator for also energizing said torque means therefrom.

4. The apparatus of claim 3, with means to vary the proportion of the output of the rebalancing generator applied to said torque means.

5. Condition control apparatus, comprising: a servomotor for operating a condition changing device; a control means for effecting and terminating operation of said motor; a gyroscope responsive to change in said condition; torque means for precessing said gyroscope; a variable voltage generator driven by said gyroscope; a variable voltage generator driven by said servomotor; means for connecting both generators to said control means; means additionally connecting said servomotor driven generator to said torque means; and means included in both connecting means to vary the proportion of the voltage selected from said servomotor driven generator.

6. Control apparatus for an aircraft, said apparatus comprising; a servomotor adapted to change the angular position of said craft about an axis thereof; an amplifier for effecting reversible operation of said servomotor; a gyroscope having angular freedom about two axes; torque means for controlling angular movement thereof about one of said axes; means for supporting said gyroscope in said craft to cause rotation of the gyroscope about said one axis on change in angular position of said craft; a voltage generator driven in proportion to rotation of said gyroscope about said one axis; a second voltage generator driven in proportion to extent of operation of said servomotor from a normal position; means for controlling said amplifier from both voltage generators; control means for energizing said torque means and connected to the second generator; and means included in said connecting means for selecting a portion of the voltage from said second generator whereby the torque tending to precess said gyroscope due to angular movement of said craft exceeds that applied by said torque means.

7. Control apparatus comprising: a gyroscope mounted on a support and having angular freedom about two axes; said gyroscope precessing about one of said axes upon rotation of said support about an axis at an angle to both said two axes; torque means for causing precession about said one axis; a voltage generator adjusted in proportion to angular movement about said one axis; control means operated by said voltage generator; a servomotor whose operation is controlled by said control means; a second voltage generator driven in proportion to extent of servomotor operation from a normal position; means for connecting said second voltage generator to said control means; and further means for connecting said second voltage generator to said torque means.

8. Condition control apparatus having a control surface to vary said condition, said apparatus comprising: a gyroscope having two axes of angular freedom and movable about one of said axes upon change in said condition; a first variable voltage generator adjusted in proportion to the extent of movement of said gyroscope about its said one axis; an amplifier; a servomotor for operating said condition control surface reversibly controlled by said amplifier; a second variable voltage generator driven by the servomotor proportional to its displacement from a normal position; torque means for effecting movement of said gyroscope about its said one axis; means for operating said amplifier from said first voltage generator and a selected portion of the voltage of said second generator; and means for energizing said torque means from another selected portion of the voltage from said second generator whereby the first voltage generator adjustment varies with the extent and rate of change in said condition.

9. In control apparatus for an aircraft having a control surface; apparatus for producing a composite electrical voltage signal having components varying with the rate of movement of said craft about an axis related to said control surface and the extent of movement of said aircraft about said axis, said apparatus comprising: a gyroscope having a rotor with angular freedom about two axes normal to each other and movable about one axis upon rotation of the aircraft about one of its axes; torque means for also effecting rotation of said gyroscope about said one axis; a first potentiometer having its slider adjusted in proportion to rotation of said gyroscope about said one axis; a second potentiometer whose slider is positioned in accordance with the movement of the first slider; a pair of voltage dividers electrically connected across said second potentiometer; means for selecting from one voltage divider a portion of the voltage from said second potentiometer and applying said selected portion to said torque means; a control means for positioning said second potentiometer slider; and means for controlling the operation of said control means from the voltage from said first potentiometer and another position of the voltage from said second potentiometer from said remaining voltage divider.

10. Control apparatus for an aircraft having an elevator control surface to control said craft about its pitch axis, said apparatus comprising: a gyroscope having a rotor with two axes of angular freedom and movable about one of said axes upon movement of the craft about its said axis; a first variable voltage generator adjusted in proportion to movement of said gyroscope about its one axis; an amplifier; a servomotor for operating said elevator surface and reversibly controlled by said amplifier; a second voltage generator driven by said servomotor; torque means for effecting movement of said gyroscope about its said one axis; means for operating said amplifier from said first voltage generator and a selected portion of the voltage of said second generator; a third voltage generator adjusted according to changes in altitude; and means for energizing said torque means from another selected portion of the voltage from said second generator and the voltage from said third generator whereby the first voltage generator adjustment varies with the extent and rate of movement of said craft about its axis and the change in altitude of said craft.

11. Control apparatus for an aircraft having a control surface to control said craft about an axis thereof, said apparatus comprising: a gyroscope having a rotor with two axes of angular freedom and movable about one of said axes upon movement of the craft about its axis; a first variable voltage generator adjusted in proportion to movement of said gyroscope about its one axis; an amplifier; a servomotor for operating said control surface and reversibly controlled by said amplifier; a second voltage generator positioned by said servomotor; torque means for effecting movement of said gyroscope about its said one axis; means for operating said amplifier from said first voltage generator and a selected portion of the voltage of said second generator; a third voltage generator; means for adjusting said third voltage generator; and means for energizing said torque means from another selected portion of the voltage from said second generator and the voltage from said third generator whereby operation of said third voltage generator can initiate changes in attitude of said craft about said axis.

12. Control apparatus for an aircraft having a control surface to control said craft about an axis thereof, said apparatus comprising: a gyroscope having a rotor with two axes of angular freedom and movable about one of said axes upon movement of the craft about its said axis; a first variable voltage generator adjusted in proportion to movement of said gyroscope about its one axis; an amplifier; a servomotor for operating said control surface and reversibly controlled by said amplifier; a second voltage generator driven by said servomotor; torque means for effecting movement of said gyroscope about its said one axis; a manually adjustable third voltage generator; means for operating said amplifier from said first voltage generator and a selected portion of the voltage of said second and third generators; and means for energizing said torque means from another selected portion of the voltage from said second and third generators for altering the trim of said craft or its attitude about its said axis.

13. Control apparatus for an aircraft having a control surface, said apparatus comprising a gyroscope with a rotor having two axes of freedom and movable about one of its axes in response to rate of turn of said aircraft about an axis; alternating voltage responsive torque means for restraining movement of said gyroscope rotor about said one axis; an alternating signal variable voltage generator adjusted in proportion to the movement of said gyroscope rotor about said axis and having an output voltage magnitude proportional to its adjustment; means, including a servomotor and discriminator amplifier for causing said servomotor to operate at a rate proportional to the voltage of said signal generator, for operating said surface, said means being connected to said alternating voltage generator; a second alternating variable voltage generator adjusted in proportion to the direction and extent of movement of the servomotor; and a control means including a second discriminator amplifier connected to said second generator and controlled thereby for energizing said torque means.

14. The apparatus of claim 13, with means responsive to change in position of said craft for further controlling said control means.

References Cited in the file of this patent

UNITED STATES PATENTS

| | | |
|---|---|---|
| 2,443,748 | Sanders et al. | June 22, 1948 |
| 2,595,250 | Harcum | May 6, 1952 |
| 2,597,077 | Douglas | May 20, 1952 |
| 2,630,282 | Halpert | Mar. 3, 1953 |
| 2,650,338 | Meredith et al. | Aug. 25, 1953 |

FOREIGN PATENTS

| | | |
|---|---|---|
| 444,393 | Great Britain | Mar. 16, 1936 |